United States Patent
Harel et al.

(10) Patent No.: US 9,448,606 B2
(45) Date of Patent: Sep. 20, 2016

(54) ADAPTIVE POWER CONFIGURATION FOR A MHL AND HDMI COMBINATION MULTIMEDIA DEVICE

(71) Applicant: BROADCOM CORPORATION, Irvine, CA (US)

(72) Inventors: Olivier Harel, Mountain View, CA (US); Andrew Robinson, Cardiff (GB); Olivier Jacquemart, Tustin (BE); Vincent Yeung, Orange, CA (US); Richard Tuck, Chepstow (GB); Darren Neuman, Palo Alto, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

(21) Appl. No.: 14/527,822

(22) Filed: Oct. 30, 2014

(65) Prior Publication Data
US 2016/0085280 A1    Mar. 24, 2016

Related U.S. Application Data

(60) Provisional application No. 62/054,302, filed on Sep. 23, 2014.

(51) Int. Cl.
| G06F 13/00 | (2006.01) |
| G06F 1/26 | (2006.01) |
| G06F 1/32 | (2006.01) |
| G06F 13/20 | (2006.01) |
| G06F 13/38 | (2006.01) |

(52) U.S. Cl.
CPC ............ *G06F 1/266* (2013.01); *G06F 1/3215* (2013.01); *G06F 1/3287* (2013.01); *G06F 13/20* (2013.01); *G06F 13/387* (2013.01)

(58) Field of Classification Search
CPC ....... G06F 1/266; G06F 13/20; G06F 1/3215
USPC .......................... 710/8–11, 14–19; 455/574
See application file for complete search history.

(56) References Cited

U.S. PATENT DOCUMENTS

| 9,131,260 | B2* | 9/2015 | Klarke | H04N 21/4221 |
| 9,286,854 | B2* | 3/2016 | Klarke | H04N 21/6125 |
| 2010/0261510 | A1* | 10/2010 | Rajamani | H04W 36/385 |
| | | | | 455/574 |
| 2014/0302921 | A1* | 10/2014 | Smith | A63F 13/02 |
| | | | | 463/31 |
| 2014/0379941 | A1* | 12/2014 | Suda | G06F 13/4252 |
| | | | | 710/11 |
| 2016/0050375 | A1* | 2/2016 | Soffer | H04N 5/268 |
| | | | | 348/445 |

* cited by examiner

*Primary Examiner* — Tammara Peyton
(74) *Attorney, Agent, or Firm* — Oblon, McClelland, Maier & Neustadt, L.L.P.

(57) ABSTRACT

A streaming apparatus includes circuitry accommodated in a High-Definition Multimedia Interface (HDMI) connectable device to detect a connection state of a Universal Serial Bus (USB) supply to the streaming apparatus; set an operational mode to a HDMI mode or a Mobile High Definition Link (MHL) mode based on the connection state of the USB supply to the streaming apparatus. The apparatus selects a supply power from the USB power supply or the MHL power supply based on the connection state of the USB supply to the apparatus.

14 Claims, 13 Drawing Sheets

ADAPTIVE POWER CONFIGURATION FOR A MHL AND HDMI COMBINATION MULTIMEDIA DEVICE

CROSS-REFERENCE TO RELATED APPLICATIONS

This application claims the benefit of priority from U.S. Provisional Application No. 62/054,302 filed Sep. 23, 2014, the entire contents of which are incorporated herein by reference.

FIELD

Exemplary embodiments described herein relate to High-Definition Multimedia Interface (HDMI) connectable streaming devices.

BACKGROUND

A networked HDMI multimedia streaming device can be connected to a digital television (DTV), AV receiver, or set-top box (STB) to permit multi-media content to be streamed over WiFi and fed to the receiver through a High-Definition Multimedia Interface (HDMI) port on the receiver. As an extension to HDMI, MHL supports both HDMI and micro-USB connectors, and permits power to be provided from the receiver to the mobile device that is connected to the receiver via a MHL link. As recognized by the present inventors, power drawn from the receiver to the mobile device does so by way of a battery in the mobile service.

The streaming device is usually configured as a dongle and includes an HDMI transmitter, a WiFi client, a multi-media (audio/video) decoding SoC with graphics capability and a USB connector. Traditionally, the streaming device is plugged directly to the DTV/AV receiver/set-top box (STB) through the HDMI connector. Multimedia content is streamed over WiFi to the device, decoded and output to the receiver through HDMI. The streaming device also accommodates connection to a USB host/charging port through a USB cable when available. However, any such streaming device must therefore be physically connected twice by being plugged into an HDMI connector and being powered via a USB cable. If another USB connector is not available as a power source for the streaming device, the USB connector receives power via a USB cable connected to a wall plug.

SUMMARY

In one embodiment, there is provided a streaming apparatus including circuitry accommodated in a High-Definition Multimedia Interface (HDMI) connectable device, the circuitry configured to detect a connection state of a Universal Serial Bus (USB) supply to the streaming apparatus; set an operational mode to a HDMI mode or a Mobile High Definition Link (MHL) mode based on the connection state of the USB supply to the streaming apparatus; and select a supply power from the USB power supply or the MHL power supply based on the connection state of the USB supply to the apparatus.

In another embodiment, there is provided a method to provide an adaptive power configuration for a High-Definition Multimedia Interface (HDMI) connectable streaming apparatus, including detecting with circuitry a connection state of a Universal Serial Bus (USB) supply to the streaming apparatus; setting with the circuitry an operational mode to a HDMI mode or a Mobile High Definition Link (MHL) mode based on the connection state of the USB supply to the streaming apparatus; and selecting a supply power from the USB power supply or the MHL power supply based on the connection state of the USB supply to the apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
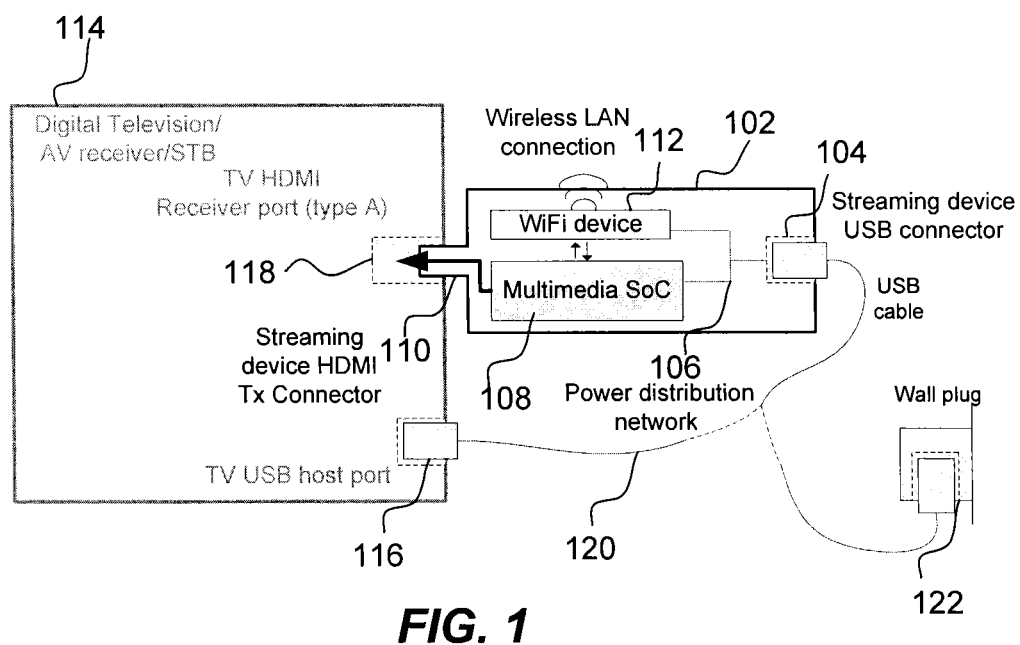
FIG. 1 is an exemplary system diagram of a streaming device plugged in a digital TV (DTV)/AV receiver/set-top box (STB)

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1 is an exemplary system diagram of a streaming device 102 plugged in a digital TV (DTV)/AV receiver/set-top box (STB) 114, generally "a receiver". Although FIG. 1 shows a streaming device 102 connected to both a wall plug 122 and a TV USB plug 116, it should be understood that the streaming device 102 is versatile and can be configured in a dongle form factor or a SOC hosted in a mobile device for example and can support dynamic power allocation in a variety of fashions as will be discussed with respect to forthcoming figures. However, in the context of FIG. 1, where power is provided via a USB host port or a wall plug, the streaming device 102 includes a USB Universal Serial Bus (USB) connector 104, a power distribution network 106, a multimedia (audio/video) decoding system-on-chip (SOC) chip 108, a High-Definition Multimedia Interface (HDMI) transmitter (TX) connector 110, and a WiFi device 112. The DTV/AV receiver/set-top box (STB) 114 includes a TV HDMI receiver (Rx) port 118, and a TV USB host port 116. The streaming device 102 is configured to be directly plugged into the HDMI Rx port 118 of the DTV/AV receiver/STB 114 through the HDMI Tx connector 110. Multimedia content is streamed over WiFi to the WiFi device 112 of the streaming device 102, and then is decoded and output to the DTV 114 through the HDMI TX connector 110. The USB connector 104 is used to supply power, and is connected to a USB host/charging port on the television 116, or the USB host/charging port from the wall plug 122.

In this layout, the streaming device 102 is physically connected twice. A first connection is between the HDMI Tx connector 110 of the streaming device 102 and the HDMI Rx connector 118 of the DTV 114. The second connection is between the USB connector 104 of the streaming device 102 and the USB host/charging port on the television 116, or the USB host/charging port from a wall plug 122.

Figure 2:
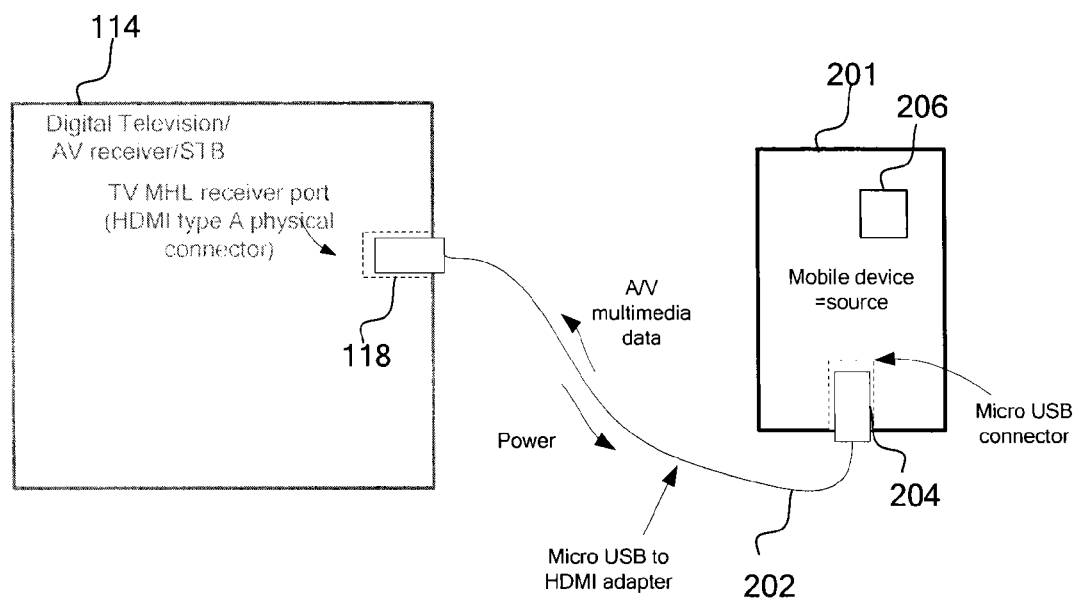
FIG. 2 is an exemplary system diagram of the streaming device connected to a Mobile High-definition Link (MHL) receiver port of the DTV/AV receiver/STB.

FIG. 2 illustrates a system diagram of the streaming device 201, which is a mobile device, connected to a Mobile High-definition Link (MHL) receiver port of the DTV/AV receiver/STB. The MHL standard allows mobile devices to be directly connected to the DTV 114, without additional power supply requirements. Therefore, the streaming device 201 employing the MHL standard, supports the use of both the HDMI connector and a micro USB physical connector 204, and allows the DTV 114 to charge the battery of the streaming device 201 via the MHL configured HDMI Rx connector 118 while the streaming device 201 is outputting multimedia content to the DTV 114. The micro USB connector 204 is connected to the HDMI Rx connector 118 of the DTV 114 through a micro USB to HDMI adapter 202.

When the streaming device 201 is using power supplied from the DTV 114, this is done by the DTV first charging a battery 206 inside the streaming device 201, and then the battery 206 provides the power for the streaming device 201. This configuration allows the streaming device 201 to use the power from its battery 206 even if the battery is recharged at a lower rate by the MHL link.

Figure 3:
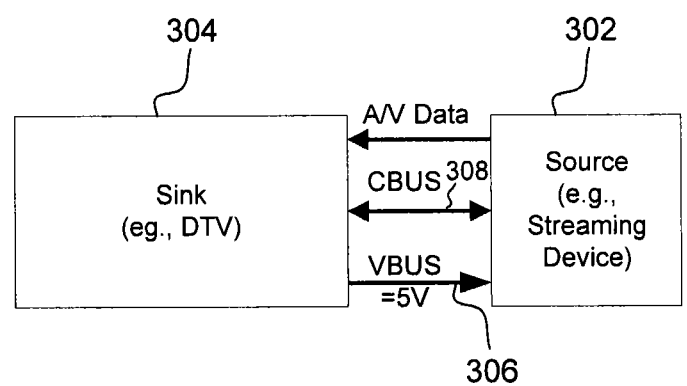
FIG. 3 is an exemplary signal interface diagram of a high level view of the MHL connection.

FIG. 3 is an exemplary signal interface diagram of a high level view of the MHL connection. Audio/Video (A/V) data is sent from a source 302 (e.g., the streaming device 102 or 201) to a sink 304 (e.g., DTV 114). A 5-V Power supply is provided by the sink 304 to the source 302 through a VBUS pin 306. A two-way link management communication between the sink 304 and the source 306 takes place over the Control BUS (CBUS) 308.

The MHL standard allows the use of the HDMI connector 118 on the receiver side to support both HDMI and MHL signaling and for use of a 3.3 k resistor on the transmitter side or on the cable to complete a CD_SENSE voltage divider circuit. In MHL mode, the source 302 is powered by the sink 304 through VBUS 306. In HDMI mode, the sink 304 is self-powered and not powered through the sink 302.

Figure 4:
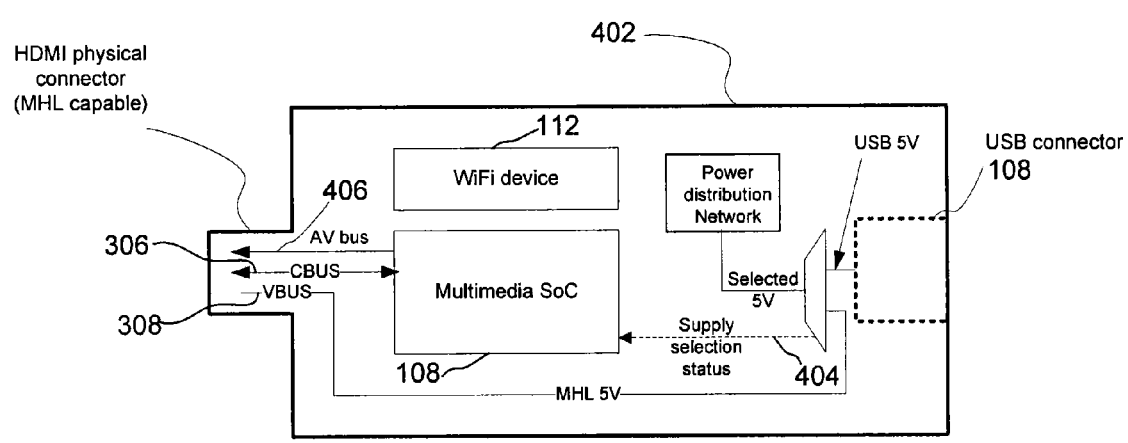
FIG. 4 is an exemplary graph of a streaming device and a power supply selection of the device.

FIG. 4 illustrates one embodiment of a MHL and HDMI combined streaming device 402 with a dual-power-supply configuration according to the present disclosure. The streaming device with the dual power configuration includes the WiFi device 112, the multimedia SOC 108, a dual power-supply selection circuit 404, a USB power connector 408, an Audio/Video bus 406, the CBUS 306 and the VBUS 308 as shown. The streaming device 402 supports two types of power supplies: a MHL VBUS power supply, and a USB power supply. By using the dual power selection circuit 404, the streaming device 402 is able to automatically detect the available supplies based on a connection between the streaming device 402 and the power supply, and then select an appropriate supply. For example, the streaming device 402 can dynamically switch from one supply to another as the source of the power supply is changed, determine a MHL operation mode or HDMI operation mode based on the power supply selection, and configure the HDMI connector as required by the MHL or HDMI specification based on the determined operation mode.

For MHL mode operation, the streaming device 402 supports a MHL discovery protocol. For HDMI mode operation, the DTV 114 provides the 5V power as required by the HDMI receiver. Generally, any fixed 5V DC supply is supported. Since the USB supply is the most common 5V DC supply used, a fixed supply that is an alternative to MHL/VBUS is referred as the USB power supply.

Using this dual-supply-support scheme, the streaming device 402 can be connected in multiple ways (e.g., to the DTV 114):

(1) If the DTV 114 has the HDMI receiver connector 118 that is compliant with MHL standard (such as the MHL 1.0 or later), the streaming device 402 can be plugged into that connector 118, negotiate the power supply with the receiver inside the DTV 114 and draw power from the MHL VBUS 306;

(2) If the DTV 114 has a USB host port (such as the USB 2.0 or later) and the HDMI receiver port is not compliant with MHL, the streaming device 402 can be plugged into the HDMI receiver connector 118 and powered through the USB host port; and (3) If the DTV 114 only has a HDMI receiver port 118 that is not compliant with MHL, the streaming device 402 can be plugged into the HDMI receiver connector and connected to a wall plug through a USB cable.

Figure 5:
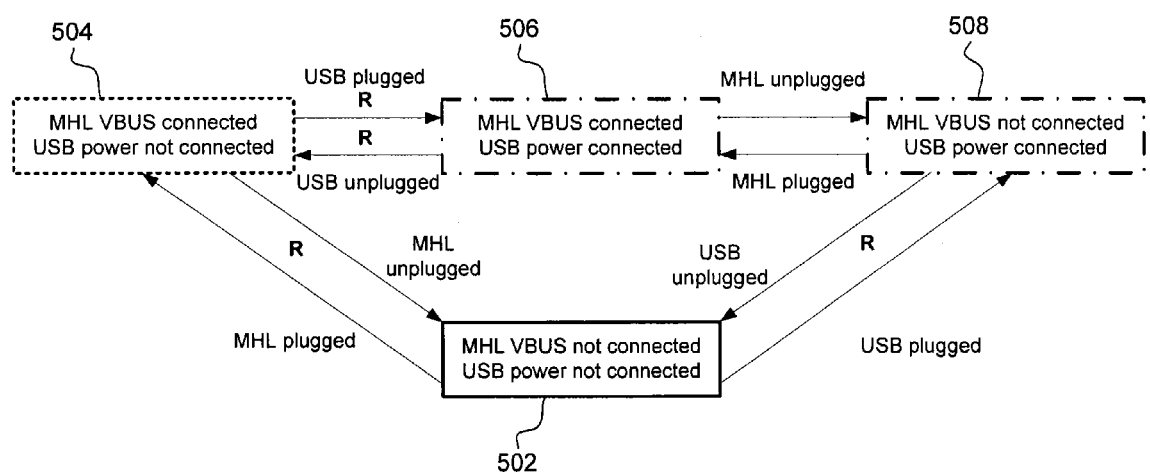
FIG. 5 is an exemplary graph of power states and transition of the streaming device.

FIG. 5 illustrates an exemplary graph of power states and transition of the streaming device 402. A mode configuration circuit configures the HDMI connector dynamically based on the selected power supply: when the USB supply is selected, the connector is set to HDMI mode; and when the MHL supply is selected, the connector is set to MHL mode.

The USB supply doesn't require any negotiation and has higher current than MHL, for example, the USB supply from the wall plug can easily provide 1.5 A at 5 V supply and more. Therefore, the USB powered system provides better system performance. For instance, the streaming device powered by the USB supply can enable a 2×2 WiFi instead of a 1×1 WiFi. The number of radios and antennas determines how many spatial streams of traffic can be sent simultaneously. The 2×2 WiFi, for example, indicates two antennas at the transmit end and 2 antennas at the receive end. As a result of using the 2×2 WiFi antennas, the streaming device obtains a better WiFi coverage range than using the 1×1 WiFi antennas. Therefore, the streaming device 402 uses a priority scheme that always selects the USB supply when available, and when if both MHL supply and USB supply are available, the streaming device 402 selects the USB supply.

FIG. 5 is a state diagram that shows the streaming device 402 has four power states: a first power state 502 in which both the MHL VBUS 308 and the USB power connector 408 are not connected, and the streaming device 402 is not powered; a second power state 504 in which MHL BUS 308 is connected while the USB power connector 408 is not connected, and the streaming device 402 is powered by the MHL supply; a third power state 506 in which both the MHL VBUS 406 and the USB power connector 408 are connected, and the streaming device 402 is powered by the USB supply; and a fourth power state 508 in which MHL VBUS 308 is not connected while the USB power connector 408 is connected, and the streaming device is powered by the USB supply. A symbol "R" represents a system reset that is generated on the board. Whenever the streaming device 402 is plugged into either the MHL supply or the USB supply, or is unplugged from the MHL supply or the USB supply, the device 402 is reset. The supply source switching scheme is configured to avoid contention, therefore, the scheme always resets the streaming device 402 whenever the supply source is switched, which enables clean glitch-less transitions where the streaming device 402 boots with a stable supply.

When the streaming device 402 is in the first power state 502 with disconnected MHL VBUS 308 and USB power connector 408, once the MHL supply is plugged into the streaming device 402, the streaming device 402 is reset first, and then is transitioned to the second state 504 and powered by the MHL VBUS 406. The opposite happens when the streaming device 402 is in the second power state 504 and is powered by MHL VBUS 308, once the MHL supply is unplugged, the streaming device 402 is reset first, and then transitioned to the first power state 502.

When the streaming device 402 is in the second power state 504 and is powered by the MHL VBUS 406, once the USB supply 410 is plugged into the streaming device 402, the streaming device 402 is reset first, is then transitioned to the third state 506 and is powered by the USB supply 410. The opposite happens when the streaming device 402 is in the third power state 506 and powered by the USB supply, once the USB supply is unplugged from the device 402, the streaming device 402 is reset first, then is transitioned to the second power state 504 and is powered by the MHL VBUS 308.

When the streaming device 402 is in the third power state 506 and is powered by the USB supply, once the MHL supply is unplugged from the device 402, the streaming device 402 is transitioned to the fourth state 508 while is still powered by the USB supply. The opposite happens when the streaming device 402 is in the fourth power state 508 and is powered by the USB supply, once the MHL supply is plugged into the device 402, the streaming device 402 is transitioned back to the third power state 506 while is still powered by the USB supply.

When the streaming device 402 is in the fourth power state 508 and is powered by the USB supply, once the USB supply is unplugged from the device 402, the device 402 is transitioned to the first state 502. The opposite happens when the streaming device 402 is in the first power state 502, once the USB supply 404 is plugged into the device 402, the device 402 is reset, then is transitioned back to the fourth power state 508 and is powered by the USB supply.

In summary, whenever the streaming device 402 is MHL powered, once the device is also connected to the USB supply, the streaming device 402 is reset and switches the supply source to the USB supply. Whenever the streaming device 402 is powered by the USB supply, plugging or unplugging the MHL supply has no impact on the power state of the device 402, and the device 402 remains powered by the USB supply.

Figure 6:
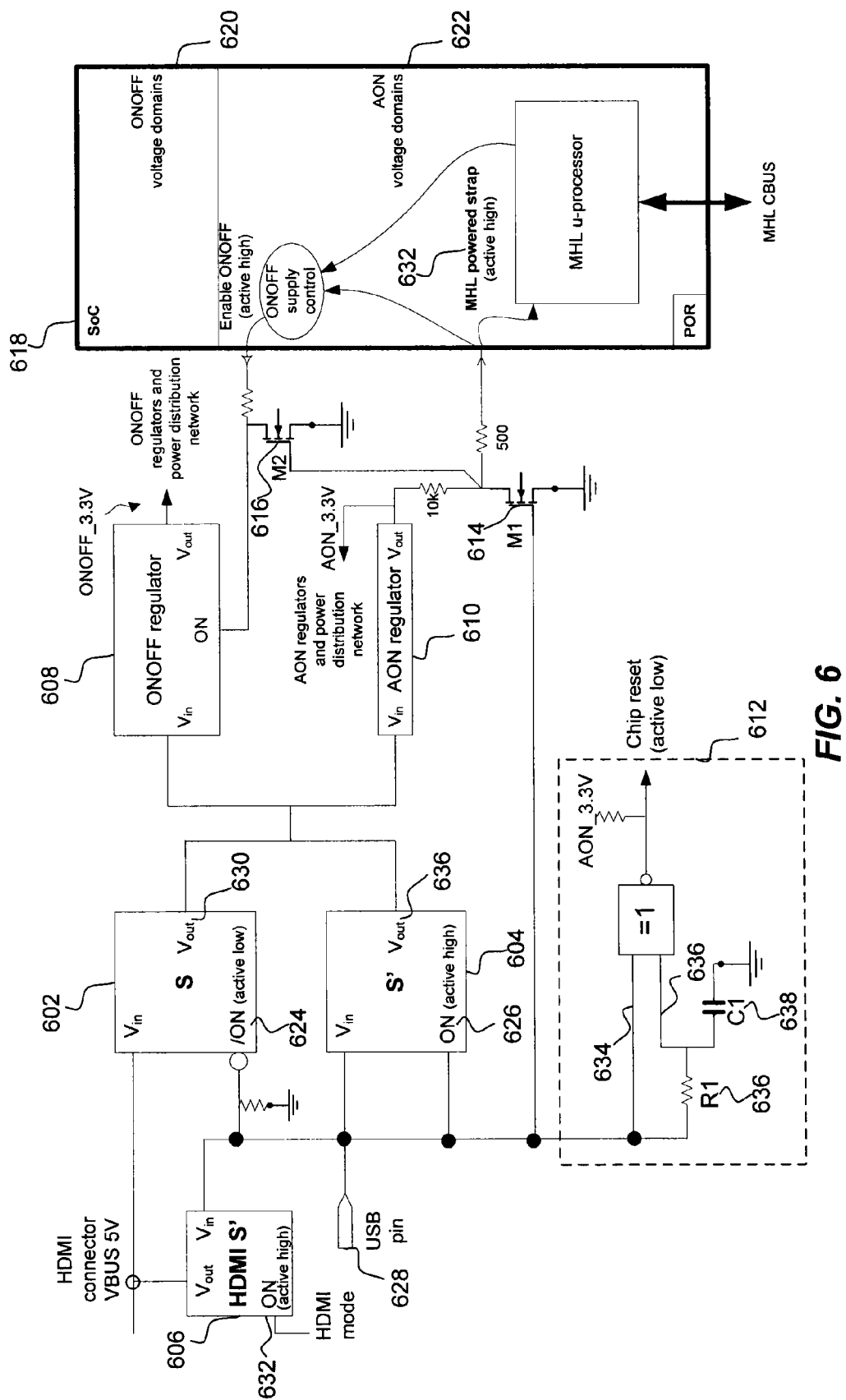
FIG. 6 is an exemplary broad view of a power supply management architecture of the streaming device.

FIG. 6 illustrates an exemplary broad view of the power supply management architecture of the streaming device 402 (FIG. 4). The selection portion of the streaming device 402 includes a switch, S, 602, a switch, S', 604, a HDMI S' switch 606, a ONOFF regulator 608, a AON regulator 610, a chip reset circuit 612, a MHL power switch transistor M1 614, a glitch alleviation transistor M2 616, and a multimedia SOC 618. The multimedia SOC 618 includes an AON voltage domain 620 and a ONOFF voltage domain 622. The AON voltage domain 620 is always ON and includes multiple supply levels (e.g., 3.3V, 1.8V, 1V). The ONOFF voltage domain 622 also includes multiple voltage levels, and the WiFi SoC 108 is in the ONOFF domain 622.

The S switch 602 is turned on when an input signal of a control pin/ON 624 is low, and is turned off when the input signal of the control pin/ON 624 is high. The S' switch 604 is turned on when a input signal of a control pin ON 626 is low, and is turned off when the input signal of the control pin ON 626 is high. The S and S' switches implement a supply selector that gives priority to the USB supply voltage, which is usually at 5V, whenever the 5V is present.

When a USB PIN 628 is connected to the USB supply, the control pin 624 of the S switch 602 is driven high and the switch 602 is turned off, while the control pin 626 of the S' switch 604 is driven high and the switch 604 is turned on. The output 636 of the turned-on S' switch 604 is the USB supply voltage, and the outputs of the S' switch 604 and the S' switch are connected to the inputs of the ONOFF regulator 608 and AON regulator 610. Therefore, the input voltage for both the ONOFF regulator 608 and the AON regulator 610 is the USB supply voltage.

Since the streaming device 402 is powered by the USB supply, the HDMI mode is selected, the control pin 632 of the HDMI S' switch 606 is driven high and the HDMI S' switch 606 is turned on. The output of the HDMI S' switch 606 is connected to VBUS 406, and thus supplies a small current at 5V over VBUS 406 to the sink 304 (e.g., DTV) in order to power a cable detection and EDID logic even when the sink 304 is powered down. Furthermore, the gate of the MHL power switch transistor M1 614 is driven by the USB supply voltage, and thus, the M1 614 is turned on and the drain of the M1 614 is pulled down to ground. The pulled-down transistor M1 614 drives the MHL-powered-strap 634 to a low voltage. The MHL-powered-strap 634 provides the multimedia SOC 618 about the information on which supply is powering the streaming device 402. When the MHL-powered-strap 634 is driven to a high voltage, such as a 3.3V voltage in AON domain, the streaming device 402 is MHL powered and is in MHL mode. When the MHL-powered-strap 634 is driven to a low voltage, such as 0 V, the streaming device is powered by the USB and is in HDMI mode. The MHL-powered-strap 634 is sampled each time when the SOC 618 is reset.

When the USB pin 628 is disconnected from the USB supply, the control pin 624 of the S switch 602 is driven low and the S switch 602 is turned on, while the control pin 626 of the S' switch 604 is driven low and the S' switch 604 is turned off. Since the streaming device 402 is not powered by the USB supply, the HDMI mode is not selected, the control pin 632 of the HDMI S' switch 606 is driven low and the HDMI S' switch 606 is turned off. The streaming device 402 operates at the MHL mode and the input of the S 602 switch is then powered by the sink 304 through VBUS 306. The output 630 of the turned-on S switch 602 is the MHL supply voltage, and thus, the input voltage for both the ONOFF regulator 608 and the AON regulator 610 is the MHL supply voltage. Furthermore, the gate of the MHL power switch transistor M1 614 is not driven by the USB supply voltage, and thus, the M1 614 is turned off and the drain of the M1 614 is pulled up to AON_3.3V, which is the 3.3V voltage in AON domain. The pulled-up transistor M1 614 drives the MHL-powered-strap 634 to high. Therefore, the streaming device 402 is MHL powered and is in MHL mode.

The reset circuit 612 monitors changes in the USB state at the USB pin 628. The reset circuit 612 compares a signal 634 transmitted from the USB pin 628, with a signal 636 that passes through a resistor-capacitor delay circuit that includes a series resistor R1 636 and a shunt capacitor C1 638. Whenever the USB supply state changes, there is a difference between the signal 634 and the signal 636, and the chip is reset. The SoC 618 also includes POR circuits which reset the SoC 618 whenever the AON supplies are low. With such a configuration, the SoC 614 and the streaming device 402 are reset at the following conditions. A first condition is whenever the USB supply state changes, no matter whether the system is already powered through the MHL VBUS 306 or not. A second condition is whenever the AON supply ramps up, which includes the case where an unpowered streaming device 402 is plugged into the MHL receiver (e.g., DTV 114).

The multimedia SOC 618 supply management includes two aspects. The first aspect is to adapt to the system supply. Whenever the USB supply state changes and the streaming device 402 is powered up, the SOC 618 and the streaming device 402 are reset and the SOC 618 samples the MHL-powered-strap 634. That strap 634 includes two states: one is MHL mode that is powered by the MHL supply, the other is HDMI mode that is powered by the USB supply.

Figure 7:
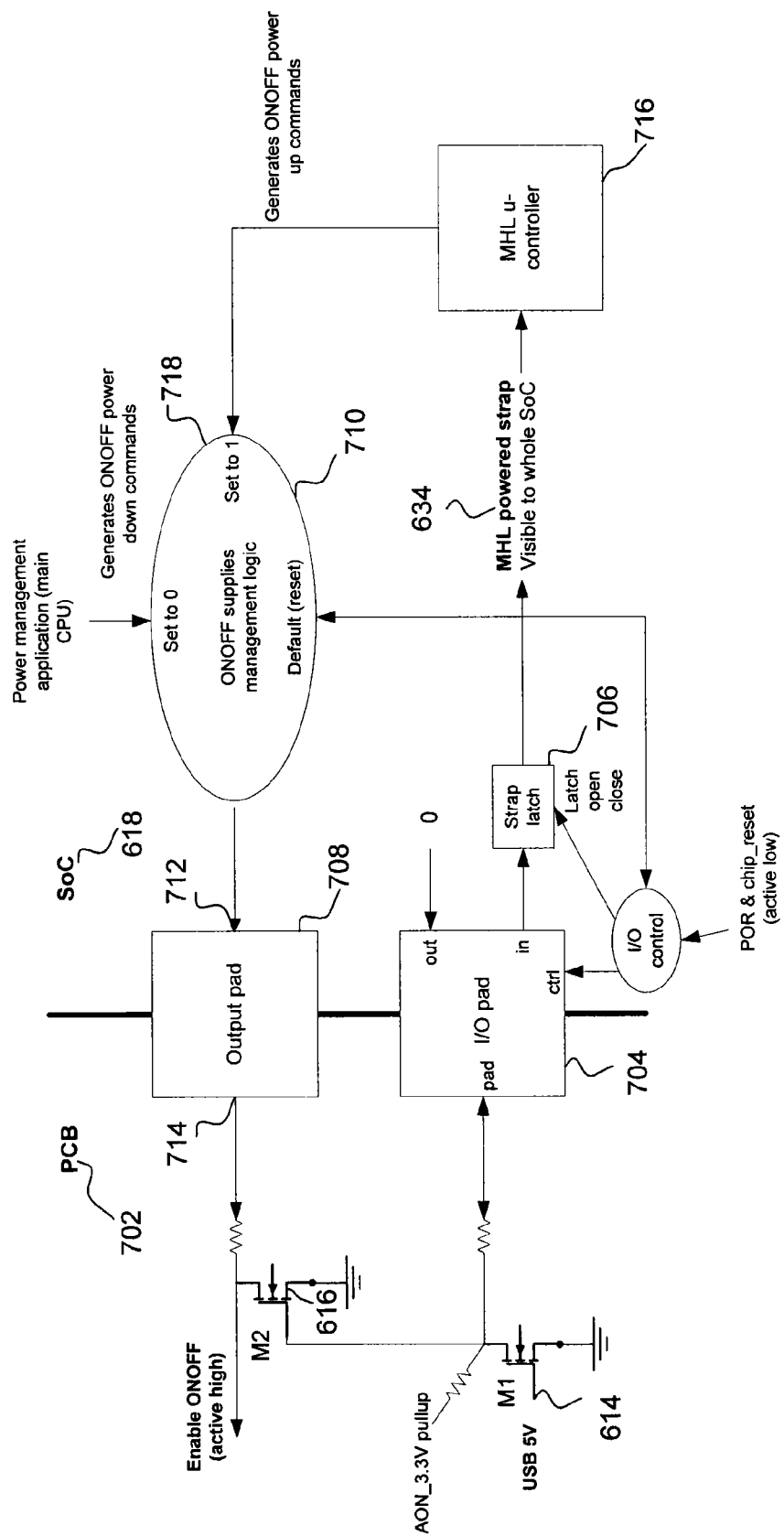
FIG. 7 is an exemplary system-on-chip view of the power supply management architecture of the streaming device.

FIG. 7 is an exemplary system-on-chip view of the power supply management architecture of the streaming device 402. During the reset (either by POR or by chip_reset), the I/O pad 704 is in input mode and the strap latch 706 is open. The SOC 618 samples the MHL-powered-strap 634 which level is defined by the PCB 702. The PCB 702 includes the S switch 602, the S' switch 604, the HDMI S' switch 606, the ONOFF regulator 608, the AON regulator 610, the chip reset circuit 612, the MHL power switch transistor M1 614, and the glitch alleviation transistor M2 616 as shown in FIG. 6. The PCB 702 provides either the AON_3.3V level voltage, or the USB_5V voltage. When reset de-asserts, the strap latch 706 is closed, the I/O state is switched to output and the I/O pad 704 drives zero voltage. The output pad 708 that drive a enable signal "enable ONOFF" of the ONOFF regulator 608, is specifically chosen to ramp up along with the JO supplies as the AON voltage domain 622 powers up. When the streaming device 402 is power by USB supply and in the HDMI mode, "Enable ONOFF" is set to ramp-up along with the AON supplies so that the ONOFF supplies automatically power up. Once the AON supplies have ramped up, the output pad 708 is enabled and is driven by the "ONOFF supplies management" internal logic 710. The default output of that logic 710 is defined by the MHL-powered-strap 634. When the streaming device 402 is powered by the USB supply and the MHL-powered-strap 634 is not asserted, the logic 710 sets "Enable ONOFF" to one, which powers up the ONOFF regulator 608. This state is consistent with the behavior of the output pad 708 which ramps up with the AON supplies before it is enabled. When the streaming device 402 is powered by the MHL supply and the MHL-powered-strap 634 is asserted, the logic 710 set "Enable ONOFF" to zero, which powers down the ONOFF regulator 608.

Figure 8:
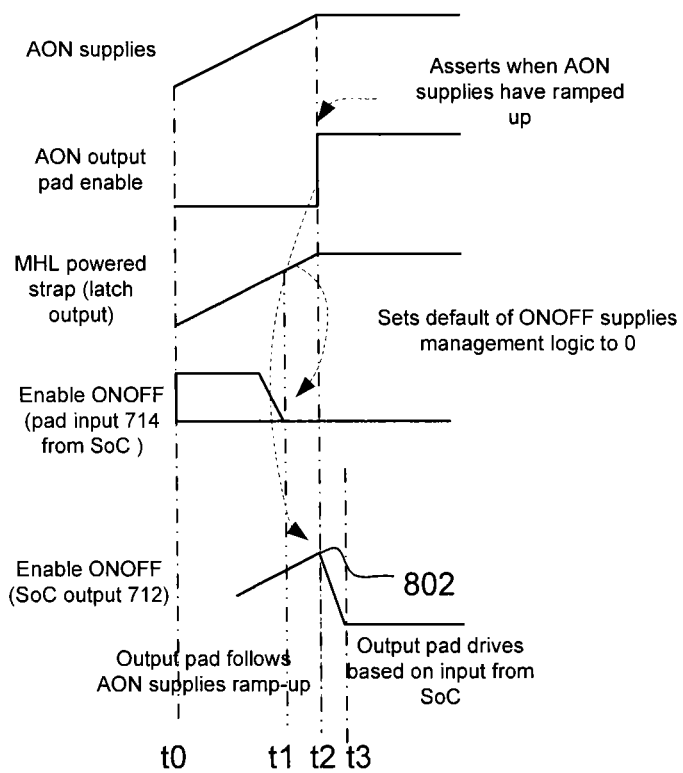
FIG. 8 is an exemplary graph of the "ONOFF" supply glitch.

FIG. 8 is a timing diagram of the signal "Enable ONFF". During the reset of the streaming device 402, the AON supplies ramp up from a time point t0 to a time point t2, the MHL-powered-strap 634 and the signal "Enable ONOFF" at the SOC 618 output 712 also ramp up. An "AON output pad enable" asserts at t2 when the AON supplies have fully ramped up. After the MHL-powered-strap 634 is asserted at t2 808, the logic 718 sets the signal "Enable ONFF" to "zero", and therefore, from the time point t2 to a time point t3, the signal "Enable ONFF" at the SOC 618 output 712 is driven from high to low and generate a clamp 802. The glitch alleviation transistor M2 616 on the PCB is used to remove the clamp 802 on the ONOFF supply. During the reset of the streaming device 402, the gate of M2 616 is driven high, by the MHL-powered-strap 634 at a time point t1, which is before the time point t2, so that the drain of M2 616 drives the signal "Enable ONFF" at the pad input 714 from the SOC 618 to the ground. Since the signal "Enable ONOFF" at the pad input 714 are driven down to ground at t1, the clamp on the signal "Enable ONFF" at the SOC 618 output 712, which happens from the time point t2 to the time point t3, will not affect the signal "Enable ONFF" at the pad input 714.

Any glitch on the ONOFF supplies when streaming device 402 is MHL VBUS 306 powered should be avoided. Moreover, if the ONOFF supplies were to glitch for a short period of time, while the SOC 618 is powered by the MHL VBUS 306 with a pre-discovery limit of 100 mA at 5V, the streaming device 402, with ONOFF supplies ramping up, could momentarily draw more power than allowed by the MHL standard.

Figure 9:
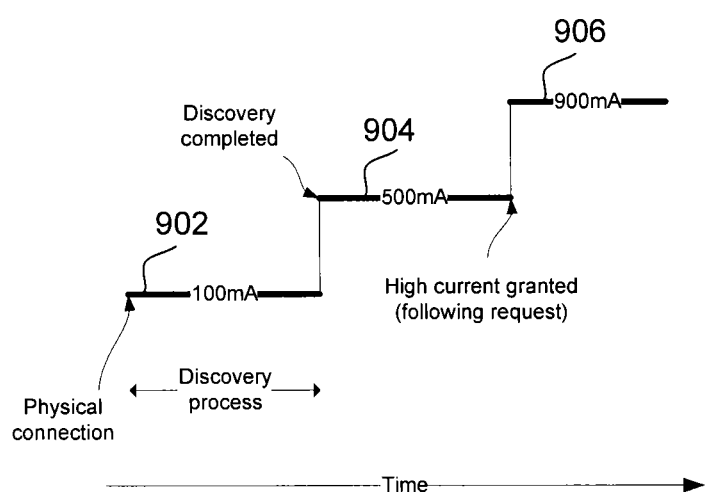
FIG. 9 is an exemplary graph of the power supply of the MHL standard.

FIG. 9 is an exemplary graph of the power supply for MHL. The MHL standard requires a discovery process between the sink 304 and the source 302. This defines an amount of current that the sink 304 (e.g., DTV 114) can supply to the source 302 (e.g., the streaming device 402). The MHL standard 2.0 includes three stages: a first stage 902 is the pre-discovery stage that operates at 100 mA current; a second stage 904 is between the completion of the discovery and a grant of a high current, which operates at 500 mA current; a third stage 906 happens after the grant of the high current of 900 mA. Table I shows current capabilities for each version of the MHL standard:

TABLE I

| MHL standard version | Required high current for MHL compliance | Optional higher current |
|---|---|---|
| 1.0 | 500 mA | No |
| 2.0/2.1 | 900 mA | Yes: up to 1.5 A |
| 3.x | 900 mA | Yes: up to 2 A |

All MHL 2.x/3.x receivers support at least 900 mA (@ 5V) of high current supply.

When the MHL-powered-strap 634 is set, the streaming device 402 is powered by MHL VBUS 306. When reset de-asserts, the MHL u-processor 716 powers up and starts to run code from a ROM. The processor 716 can also run code from an on-board Flash memory. At that time the AON supplies 622 are powered up and the ONOFF supplies 620 are powered down. The AON supplies have very low current loads and the system complies with the first stage 902 where the 100 mA at 5V limit is required by the MHL standard.

The MHL compliant code running on the MHL u-processor 716 completes the discovery process 902 with a MHL receiver (e.g., DTV 114), and then requests the high current from the MHL receiver. Once the high current has been granted by the MHL receiver, the MHL u-processor 716 issues an "ONOFF power up command" to the "ONOFF supplies management" 718 logic which, in turn, drives the signal "Enable ONOFF" to one, which is an active high. As a result, the ONOFF supplies power up, and the streaming device 402 then boots and support its main functions (e.g., WiFi link, A/V decode, output to the MHL receiver). The MHL driver is loaded on the main CPU at the ONOFF voltage domain 620 and takes over the management of the MHL CBUS 308 from the MHL u-processor 716.

If, after the system has booted, the MHL receiver requests the streaming device to revert to the first stage that operates at 100 mA @ 5V the power management application running on the host CPU at the ONOFF domain 620 starts to instruct the "ONOFF supplies management" logic 710 to power ONOFF down. At that time, the MHL u-processor 716 tries to complete the discovery process again, and, if successful, will power ONOFF back up.

Finally, when the MHL-powered-strap 634 is not set, the MHL u-processor 716 remains off when reset de-asserts. ONOFF supplies are powered up by default, the MHL driver is loaded on the main CPU at the ONOFF domain 620 and takes directly control of the MHL CBUS 308.

The MHL specification allows the use of an HDMI connector on the receiver side to support both the HDMI and the MHL signaling. The specification further defines a "Cable Detect" (CD) mechanism for the receiver to determine whether to operate in the HDMI mode or the MHL mode. In the MHL mode, the source 302 is powered by the sink 304 through VBUS 306. In the HDMI mode, the source 302 and the sink 304 are independently self-powered. The HDMI specification then requires the source 302 to supply a small current at 5V over VBUS 306 to the sink to power cable detection and EDID logic even when the sink 304 is powered down.

The HDMI connector pin assignment for MHL/HDMI mode is listed in Table II.

TABLE II

| Pin # | HDMI | MHL 2 | MHL 3 |
|---|---|---|---|
| 1 | TMDS Data2+ | N/C | N/C |
| 2 | TMDS Data2 Shield | CD_SENSE | CD_SENSE |
| 3 | TMDS Data2− | N/C | N/C |
| 4 | TMDS Data1+ | N/C | N/C |
| 5 | TMDS Data1 Shield | TMDS_GND | TMDS_GND |
| 6 | TMDS Data1− | N/C | N/C |
| 7 | TMDS Data0+ | MHL+ | MHL+ |
| 8 | TMDS Data1 Shield | MHL Shield | MHL Shield |
| 9 | TMDS Data 0− | MHL− | MHL− |
| 10 | TMDS Clock+ | N/C | N/C or eCBUS D+ |
| 11 | TMDS Clock Shield | TMDS_GND | TMDS_GND or eCBUS Shield |
| 12 | TMDS Clock− | N/C | N/C or eCBUS D− |
| 13 | CEC | N/C | N/C |
| 14 | Utility | N/C | N/C |
| 15 | SCL | CD_PULL_UP | CD_PULL_UP |
| 16 | SDA | N/C | N/C |
| 17 | DDC/CEC GND | VBUS_CBUS_GND | VBUS_CBUS_GND |
| 18 | +5 V Power | VBUS | VBUS |
| 19 | Hotplug Detect | CBUS | oCBUS/eCBUS |
| Shell | Shield | Shield | Shield |

Figure 10A:
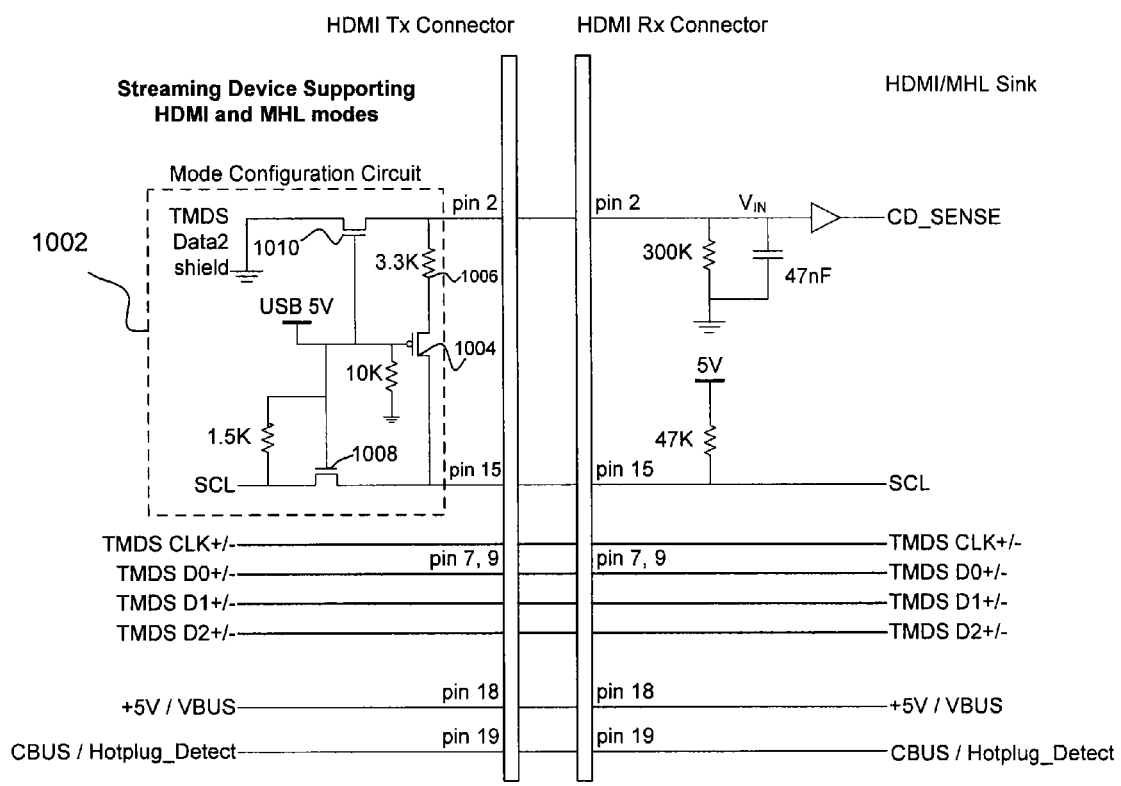
FIG. 10A is an exemplary graph of a configuration circuit of a HDMI connector.

FIG. 10A is an exemplary graph of a configuration circuit 1002 of a HDMI connector according to the present disclosure. For a receiver to select MHL mode, a 3.3K resistor 1006 is required on the transmitter side or embedded in the cable. The 3.3K resistor 1006 completes the Cable Detect Sensing (CD_SENSE) circuit which is a voltage divider circuit. The CD_SENSE signal with a logic "one" tells the receiver that the MHL source is connected. The receiver is set to the MHL mode and outputs 5V to the VBUS pin.

For a receiver to select HDMI mode, the voltage divider circuit is disconnected due to the pin assignment on the HDMI transmitter. The resulting CD_SENSE logic is "zero" and +5V at the pin 18 tells the receiver to select the HDMI mode of operation.

Figure 10B:
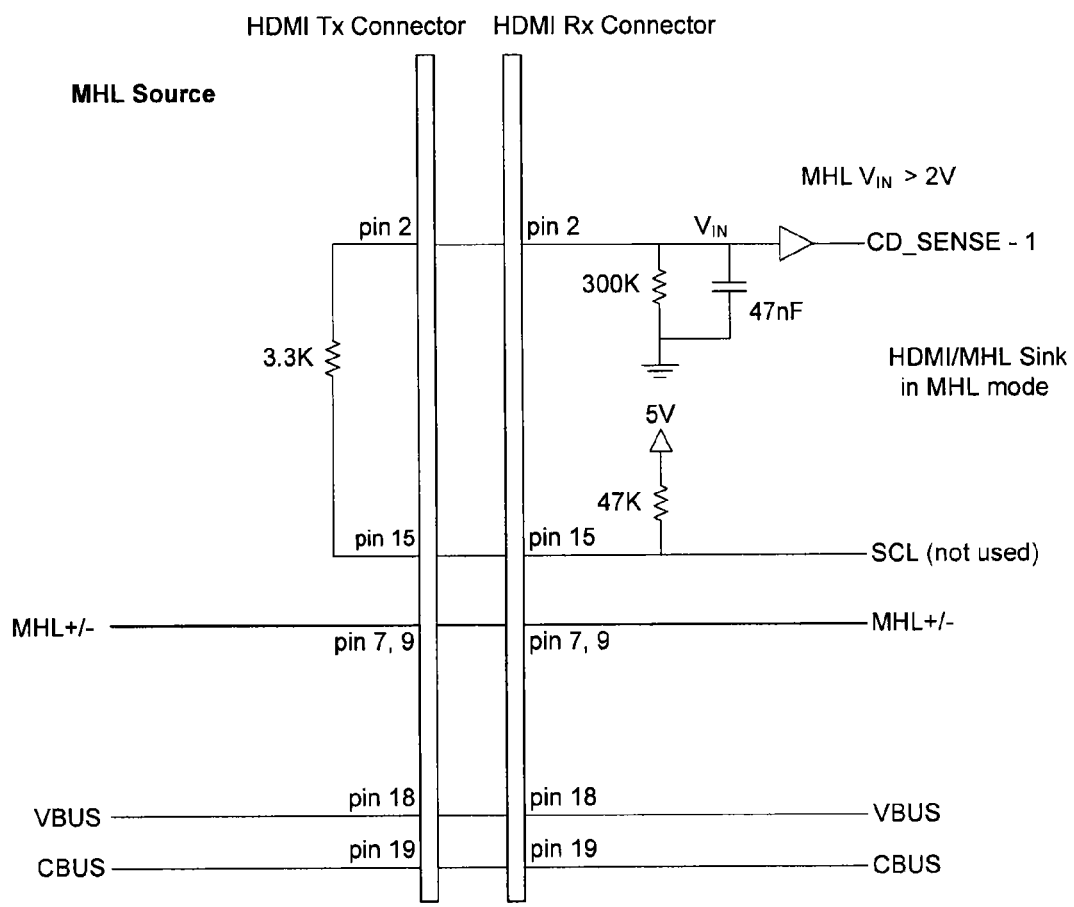
FIG. 10B is an exemplary graph of a MHL mode of the HDMI connector.

To that effect, a mode configuration circuit is used to select HDMI or MHL mode based on the presence of the USB supply. The function of the configuration circuit 1002 is described below:

When the USB supply is absent, the PMOS transistor 1004 is turned on, NMOS transistor 1008 and 1010 are turned off. The 3.3K resistor 1006 is then switched on, with a pin 2 and a pin 15 are switched off from ground and pull-up, respectively. This configuration is shown in FIG. 10B, and tells the receiver to operate into the MHL mode.

Figure 10C:
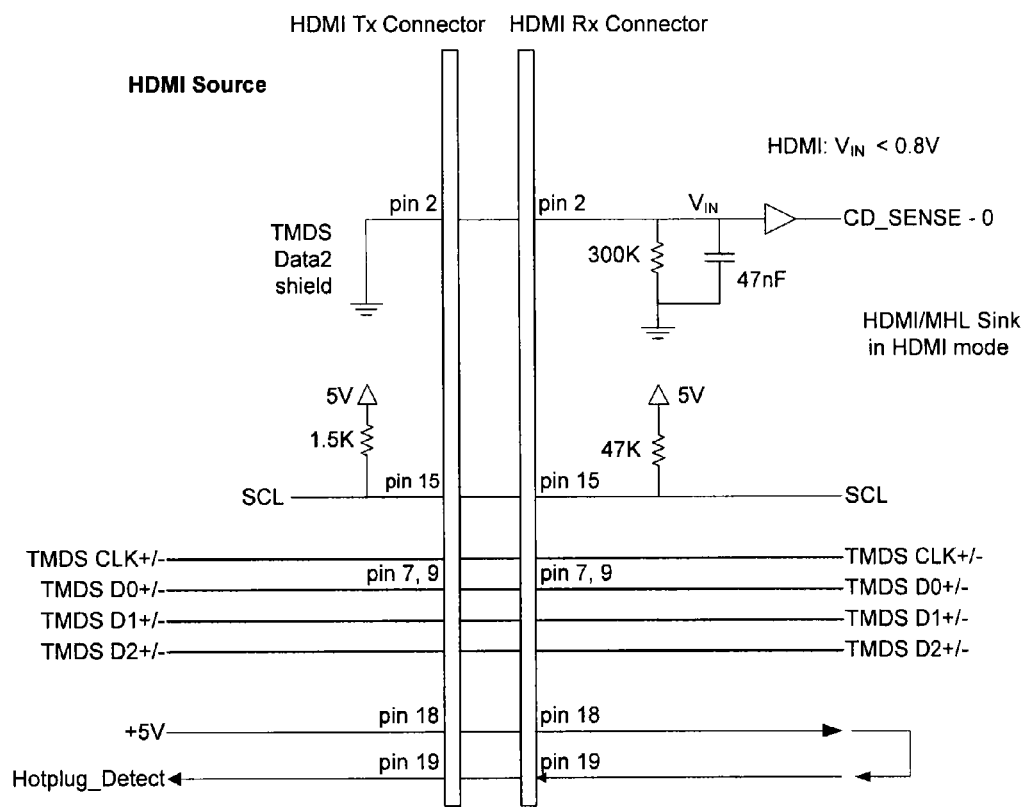
FIG. 10C is an exemplary graph of a HDMI mode of the HDMI connector.

When the USB supply is present, the PMOS transistor 1004 is turned off, NMOS transistor 1008 and 1010 are turned on. The 3.3K resistor 1006 is switched off, with the pin 2 and the pin 15 switched on to connect to ground and pull-up, respectively. This configuration is shown in FIG. 10C and tells the receiver to operate into the HDMI mode.

Further, when the USB supply is present (in the HDMI mode), the HDMI S' switch drives 5V on the VBUS pin 306 of the HDMI connector 110. The HDMI S' switch is chosen with "reverse protection" to handle transitions between the MHL and the HDMI mode: as the streaming device 402 changes the HDMI configuration from the MHL mode to the HDMI mode by adjusting the pin 2 and pin 15 resistance, the sink may not transit to HDMI mode right away and may keep on driving 5V on the VBUS pin 306 of the HDMI connector 110 for a short period of time.

The streaming device 402 inserts a delay between the reconfiguration of the resistance between pins 2 & 15 of the HDMI connector and the driving of 5V on the HDMI VBUS pin 306, when it is switched from the MHL mode to HDMI mode. The detail operations of the streaming device 402 are listed below.

The HDMI S' switch 606 can be enabled with a long OFF to ON assertion delay, such as several ms, which exceeds a transition time of the resistor configuration circuit 1002. The ON pin 632 of the HDMI S' switch 606 can then be tied to USB 5V to implement this configuration.

Furthermore, the need to drive 5V on the HDMI connector in HDMI mode, is primarily to support features like cable detect and EDID, which are not required during the boot of the streaming device 402. Therefore, the SOC 618 can override a pull-down through a pin, after it has booted, to enable the ON pin of the HDMI S' switch 606.

When in the MHL mode, a battery-less streaming device must limit its current consumption to a value defined by the MHL specification. The streaming device 420 can be built and screened with the right feature set to target this max power consumption. For more accuracy, the streaming device 402 can monitor its current consumption and adjust dynamically its feature set so as not to exceed the standard current limitation. Monitoring can be achieved by tracking the voltage drop across a known resistor on the MHL VBUS 5V supply and measuring it against a high precision internal reference (e.g., bandgap); or by making use of a PMU (Power Management Unit) that consumes during the streaming device 402 switches its regulators supply by counting Pulse Width Modulation (PWM) on/off cycles.

The streaming device 402 can further reports its power status through LEDs. The SOC 618 drives the control of LEDs. By default at the power up and the reset, the LED is powered off. When the ONOFF domain 620 of the SOC 618 powers up, logic running in the ONOFF domain 620 turns on the LED indicating that the SoC 618 is properly powered and can operate a desired feature set. The operating scheme is described below.

When the streaming device 402 is in the MHL mode, the ONOFF domain 620 only powers if the MHL sink grants high current and the ON state of the LED indicates a successful MHL VBUS power negotiation.

When the streaming device 402 is in the HDMI mode the ONOFF domain 620 powers up automatically and the LED is turned on. In case the streaming device 402 is plugged into a USB power source with insufficient current rating, such as plugging a 900 mA rated device in a 500 mA rated USB2.0 host port, the LED may be turned ON at first. When the current consumption of the streaming device 402 exceeds the current of the USB power source, the USB 5V supply drops. The POR circuitry detects the voltage drop and resets the streaming device 402, which causes the LED control to revert to is OFF state. The ON and OFF states can be replaced by color codings. For example, the ON state can be replaced by a green code, and the OFF state can be replaced by a red code.

Figure 11:
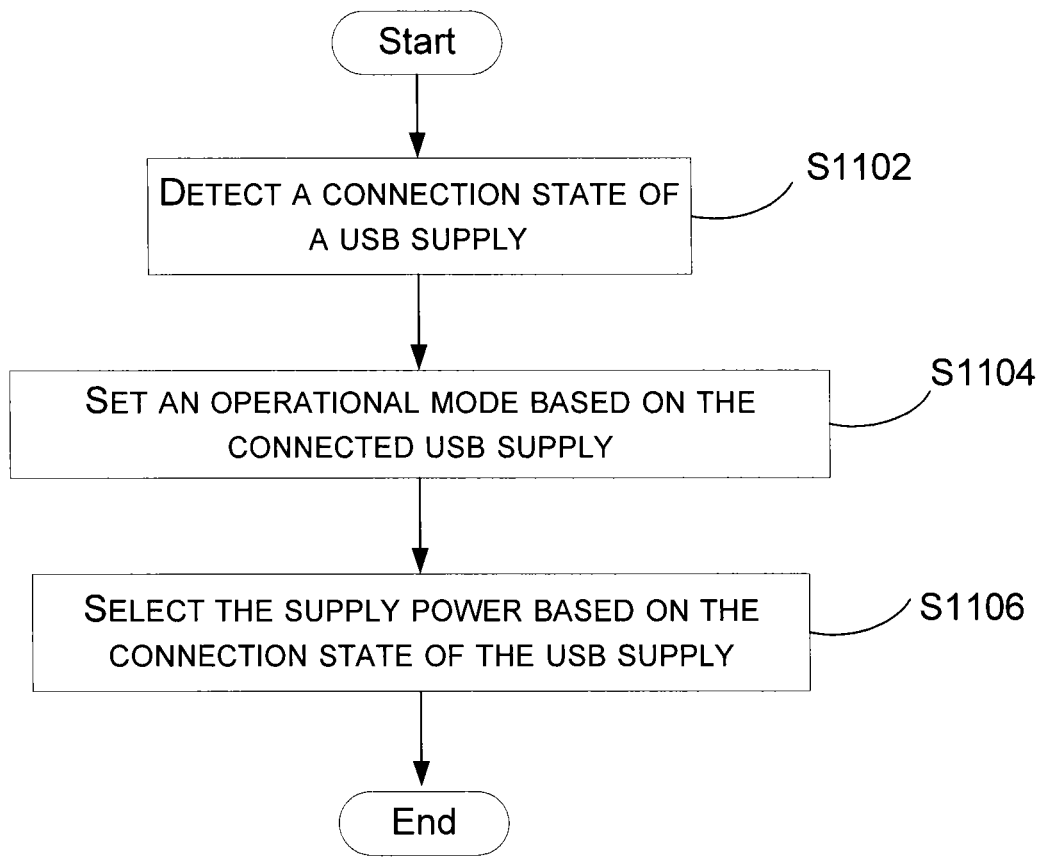
FIG. 11 is an exemplary operation flowchart of the streaming device.

FIG. 11 is an exemplary operation flowchart of the streaming device.

At step 1102, the processing circuitry detects a connection state of the USB supply to the streaming apparatus.

At step 1104, the processing circuitry sets the operational mode to the HDMI mode or the MHL mode based on the connection state of the USB supply to the streaming apparatus.

When the USB supply is connected to the streaming device 402, the operational mode is set to the HDMI mode. When the USB supply is not connected to the streaming device 402, the MHL supply is selected, the operation mode is set to MHL mode.

At step 1106, the processing circuitry selects a supply power from the USB power supply or the MHL power supply based on the connection state of the USB supply to the apparatus.

Whenever the streaming device 402 is connected to the USB supply, it is powered by the USB supply. Plugging or unplugging the MHL supply has no impact on the power state of the device 402, and the device 402 remains powered by the USB supply. Whenever the streaming device 402 is not connected to the USB supply and only connected to the MHL supply, it is powered by the MHL. Once the device is also connected to the USB supply, the streaming device 402 is reset and switches the supply source to the USB supply.

Thus, the foregoing discussion discloses and describes merely exemplary embodiments. As will be understood by those skilled in the art, the present disclosure may be embodied in other specific forms without departing from the spirit or essential characteristics thereof. Accordingly, the disclosure is intended to be illustrative, but not limiting of the scope of the all the embodiments, as well as other claims. The disclosure, including any readily discernible variants of the teachings herein, define, in part, the scope of the foregoing claim terminology such that no disclosed subject matter is dedicated to the public.

The invention claimed is:

1. A streaming apparatus comprising:
   circuitry accommodated in a High-Definition Multimedia Interface (HDMI) connectable device, the circuitry configured to
   detect a connection state of a Universal Serial Bus (USB) port of the streaming apparatus;
   set an operational mode to a HDMI mode or a Mobile High Definition Link (MHL) mode based on the connection state of the USB port of the streaming apparatus; and
   cause the streaming apparatus to draw power from the USB port when the state of the USB port indicates that the USB port is connected to another USB port or an MHL port,
   wherein the circuitry is further configured to set the operation mode to the HDMI mode when the USB port is detected by the circuitry to be connected to the other USB port.

2. The apparatus of claim 1, wherein the circuitry is further configured to set the operational mode to the MHL mode when the state of the USB port indicates that the USB port is connected to the MHL port.

3. The apparatus of claim 1, wherein the circuitry include a HDMI transmitter connector and is further configured to set the HDMI transmitter connector to one of the HDMI mode and the MHL mode based on the connection state of the USB port.

4. The apparatus of claim 1, wherein the circuitry is further configured to reset the operational mode in response to the circuitry detecting a change in the connection state of the USB port of the streaming apparatus so as to suppress a power glitch when the streaming apparatus boots from a stable power supply.

5. The apparatus of claim 1, wherein the circuitry includes power management circuitry configured to track power consumed to switch a regulator supply by counting on and off cycles of a pulse width modulation signal.

6. A method to provide an adaptive power configuration for a High-Definition Multimedia Interface (HDMI) connectable streaming apparatus, comprising:
   detecting, with circuitry, a connection state of a Universal Serial Bus (USB) port of the streaming apparatus;
   setting, with the circuitry, an operational mode to a HDMI mode or a Mobile High Definition Link (MHL) mode based on the connection state of the USB port of the streaming apparatus; and
   selecting, with the circuitry, a supply causing the streaming apparatus to draw power from the USB port when the connection state of the USB port indicates that the USB port is connected to another USB port or an MHL port,
   wherein the setting further comprises setting, with the circuitry, the operation mode to the HDMI mode when the USB port is connected to the other USB port.

7. The method of claim 6, wherein the setting further comprises setting, with the circuitry, the operation mode to the MHL mode when the USB port is connected to the MHL port.

8. The method of claim 6, further comprising setting a HDMI transmitter connector to one of the HDMI mode and the MHL mode based on the connection state of the USB port of the streaming apparatus.

9. The method of claim 8, further comprising resetting the operational mode in response to a change in the connection state of the USB port of the streaming apparatus so as to suppress a glitch when the streaming apparatus boots from a stable power supply.

10. The method of claim 6, further comprising:
    charging, with the circuitry, a battery of the streaming apparatus when the connection state of the USB port indicates that the USB port is connected to the other USB port or the MHL port.

11. The method according to claim 10, wherein the streaming apparatus continues to draw power from the battery while the battery is being charged.

12. A non-transitory computer-readable medium storing executable instructions, which when executed by a computer processor, cause the computer processor to execute a method comprising:
  detecting with the computer processor a connection state of a Universal Serial Bus (USB) port of the streaming apparatus;
  setting with the computer processor an operational mode to a HDMI mode or a Mobile High Definition Link (MHL) mode based on the connection state of the USB port of the streaming apparatus; and
  selecting a supply causing the streaming apparatus to draw power from the USB port when the connection state of the USB port indicates that the USB port is connected to another USB port or an MHL port,
  wherein the setting further comprises setting, with the circuitry, the operation mode to the HDMI mode when the USB port is connected to the other USB port.

13. A streaming apparatus comprising:
  circuitry accommodated in a High-Definition Multimedia Interface (HDMI) connectable device, the circuitry configured to
    detect a connection state of a Universal Serial Bus (USB) port of the streaming apparatus;
    set an operational mode to a HDMI mode or a Mobile High Definition Link (MHL) mode based on the connection state of the USB port of the streaming apparatus; and
    cause the streaming apparatus to draw power from the USB port when the state of the USB port indicates that the USB port is connected to another USB port or an MHL port, and
  a battery configured to power the streaming apparatus,
  wherein the circuitry charges the battery with power drawn from the USB port when the connection state of the USB port indicates that the USB port is connected to the other USB port or the MHL port, and
  wherein the circuitry sets the operation mode to the HDMI mode when the USB port is connected to the other USB port.

14. The apparatus of claim 13, wherein the streaming apparatus continues to draw power from the battery while the circuitry charges the battery.

* * * * *